United States Patent
Taitt et al.

(10) Patent No.: US 9,688,352 B2
(45) Date of Patent: Jun. 27, 2017

(54) HUBS INCORPORATING A VARIABLE RATIO TRANSMISSION SYSTEM

(71) Applicant: NEXXTDRIVE LIMITED, London (GB)

(72) Inventors: David Taitt, London (GB); Linan Gong, London (GB)

(73) Assignee: Nexxtdrive Limited, London (GB)

( * ) Notice: Subject to any disclaimer, the term of this patent is extended or adjusted under 35 U.S.C. 154(b) by 246 days.

(21) Appl. No.: 14/437,761

(22) PCT Filed: Oct. 9, 2013

(86) PCT No.: PCT/GB2013/052625
§ 371 (c)(1),
(2) Date: Apr. 22, 2015

(87) PCT Pub. No.: WO2014/064419
PCT Pub. Date: May 1, 2014

(65) Prior Publication Data
US 2015/0291256 A1    Oct. 15, 2015

(30) Foreign Application Priority Data

Oct. 23, 2012   (GB) .................................. 1219062.5

(51) Int. Cl.
*F16H 3/72*    (2006.01)
*B62M 11/18*   (2006.01)
(Continued)

(52) U.S. Cl.
CPC .............. *B62M 11/18* (2013.01); *B62M 6/45* (2013.01); *B62M 6/65* (2013.01); *B62M 11/16* (2013.01); *F16H 3/728* (2013.01)

(58) Field of Classification Search
None
See application file for complete search history.

(56) References Cited

U.S. PATENT DOCUMENTS

2006/0063628 A1 *  3/2006  Sowul ................... B60K 6/365
                                                    475/5
2008/0070736 A1    3/2008  Yoshino et al.
(Continued)

FOREIGN PATENT DOCUMENTS

EP    1642820 B1    8/2007
EP    2204316 A1    7/2010
(Continued)

*Primary Examiner* — Edwin A Young
(74) *Attorney, Agent, or Firm* — Olson & Cepuritis, Ltd.

(57) ABSTRACT

A hub comprises a cylindrical, hollow hub member which is mounted to rotate about its axis and accommodated in whose interior is a continuously variable ratio transmission system having an input, which is mounted to rotate about the axis, and an output mounted to rotate with the hub member. The transmission system comprises a single epicyclic gearset including a sun gear in mesh with a plurality of planet gears mounted to rotate about respective planet shafts carried by a common carrier, which is mounted to rotate with the input about the axis. The planet gears are in mesh with an annulus gear, which is connected to rotate with the rotors of first and second electric motor/generators, respectively. The electrical connections of the stators of the two motor/generators are connected by a controller arranged to control the transmission of power from one motor/generator to the other. The hub further includes a one-way clutch, which includes a drive member, which is constituted by the common carrier and a driven member, which is connected to rotate with the hub member. The one-way clutch is arranged to connect the hub member to rotate with the carrier as soon as the carrier rotates faster than the hub member.

14 Claims, 2 Drawing Sheets

(51) Int. Cl.
*B62M 6/65* (2010.01)
*B62M 11/16* (2006.01)
*B62M 6/45* (2010.01)

(56) References Cited

U.S. PATENT DOCUMENTS

| | | | |
|---|---|---|---|
| 2010/0170731 A1* | 7/2010 | Jordan | B62M 6/65 180/65.7 |
| 2011/0027105 A1* | 2/2011 | Haupt | F16H 3/54 417/53 |
| 2012/0012412 A1* | 1/2012 | Moeller | B62M 6/45 180/206.2 |
| 2012/0161497 A1 | 6/2012 | He | |

FOREIGN PATENT DOCUMENTS

| | | | |
|---|---|---|---|
| EP | 2218634 A1 | 8/2010 | |
| JP | 2008285069 A | 11/2008 | |
| TW | 201130703 A1 | 9/2011 | |
| WO | WO 2012/131953 A1 | 10/2012 | |

\* cited by examiner

HUBS INCORPORATING A VARIABLE RATIO TRANSMISSION SYSTEM

CROSS REFERENCE TO RELATED APPLICATION

This application is a 371 National Stage of International Application No. PCT/GB2013/052625, filed Oct. 9, 2013, incorporated herein by reference in its entirety.

The present invention relates to hubs, particularly though not exclusively hubs for or incorporated in vehicle wheels, particularly bicycle wheels or motorcycle wheels, and is concerned with that type of hub which incorporates a variable ratio transmission system.

Bicycle wheels are known with a hub which incorporates a variable ratio transmission system but this transmission system can only provide a relatively small number of discrete gear ratios. It would be desirable to provide a bicycle wheel with a hub incorporating a transmission system of continuously variable ratio.

There is an ever-increasing social and legislative pressure on the manufacturers of motor vehicles to provide engines with a reduced fuel consumption and thus reduced emission of pollutants. One way of achieving these aims is to ensure that the transmission system of the vehicle always uses the optimum gear ratio and this can only be achieved by providing that the transmission system is of continuously or steplessly variable type and thus has an infinite number of gear ratios. One of the results of the pressure referred to above to reduce the fuel consumption and thus the emission of pollutants by engines is that vehicles of so-called hybrid type are rapidly increasing in popularity. There is therefore also a need for a transmission system which can simply combine both a mechanical power input and an electrical power input into a single mechanical power input.

EP1642820B discloses hub incorporating a variable ratio transmission system for use in e.g. bicycles. The transmission system includes two compounded epicyclic gearsets, each of which includes a sun gear in mesh with a plurality of planet gears carried by a respective common carrier. One element of one of the gearsets is connected to the input of the transmission system and another element of one of the gearsets is connected to rotate with the hollow hub member. The two sun gears are connected to the rotors of first and second reversible machines, in particular electrical motor/generators, the power connections of the two stators being connected together via a controller arranged to control the transmission of power from one machine to the other.

Extensive development analysis of the hub disclosed in this prior document showed that some serious problems still required solutions. The presence of a second epicyclic geartrain made assembly, especially of the wiring, complex, costly and slow. It was also found that the known hub is not able to consistently and efficiently combine an input mechanical torque provided by the rider of the bicycle or by an internal combustion engine with an electrical input torque produced by one of the motor/generators. The known hub also suffers from so-called "pedal dropping" syndrome in which, when the rider applies a force to the pedals of the bicycle, the pedal crank rotates with little or no resistance and this is inconvenient and disconcerting for the rider. Pedal dropping can in fact occur with the known hub under two quite different circumstances. Firstly, when the bicycle is climbing a steep hill, the rider may exert a substantial force on the pedals and this may produce a torque on the sun gear which is greater than the reactive torque which the motor/generator connected to the sun gear is able to produce. This results in the pedals suddenly moving rapidly against a reduced resistance which in turn can result in the rider lurching forwards and even, in extreme cases, falling off the bicycle. Secondly, when the bicycle is at rest, e.g. when waiting at traffic lights, it is common for the rider to move one of the pedals to an elevated position and then to rest his foot on it in preparation for applying a substantial force to it to start cycling again when the traffic lights turn green. However, when the bicycle is stationary, no electric power at all will be applied to the motor/generator connected to the sun gear, which will mean that the motor/generator is unable to exert any reactive torque at all. Under these conditions, even the gentle force of the weight of the user's foot applied to the pedal is sufficient for the pedal to rotate, that is to say to move downwardly, and this means that the pedal will be at a lower and thus sub-optimal position when the cyclist wishes to start moving again. Finally, it is found to be difficult with the known hub to provide a complete or consistent "get home" capability in the event of battery failure, that is to say to enable the bicycle to operate efficiently when powered by the rider only and also whilst using one of the motor/generators as a dynamo to provide power for the bicycle lighting system.

JP2008285069A discloses an electric bicycle with a transmission system of the general type discussed above, although the transmission system is in fact associated with the bicycle crankshaft and is not incorporated into the hub of one of the wheels. The transmission system disclosed in this document has an input constituted by the bicycle crankshaft and an output constituted by a pulley or the like for engagement by a belt for transmitting power to the rear wheel. The transmission system includes a sun gear, which is mounted to rotate with respect to the crankshaft and is in mesh with a number of planet gears. The planet gears are carried by a common carrier and are in mesh also with an annulus gear connected to the output. The common carrier is connected to rotate with the crankshaft. The sun gear is connected to rotate with the rotor of a first electric motor/generator and the annulus gear is connected to rotate with the rotor of a second electric motor/generator. The common carrier is in fact connected to the crankshaft by means of a first one-way clutch but this is essentially only a free-wheel mechanism of a type commonly provided on bicycles for enabling the bicycle to coast down a hill without the pedals being necessarily rotated in synchronism with the rotating wheels. The sun gear is connected to the rotor of the first motor/generator by a second one-way clutch, which will be engaged when the first motor/generator is driving the sun in normal operation of the bicycle so as to adjust the transmission ratio but will be disengaged when the sun gear rotates more rapidly than, and thus attempts to back-drive, the first motor/generator. The purpose of the second one-way clutch is not clear and is not described in the document.

When the bicycle of the prior Japanese document is at rest and the rider rests his foot on one of the pedals in an elevated position, the slight torque that is exerted on the sun gear will tend to rotate it in the normal clockwise direction and the second one-way clutch will therefore disengage. There will therefore be no significant resistance to rotation of the sun gear and the pedal dropping referred to above will occur. If the bicycle of the prior document is climbing a hill and the rider exerts a substantial force on the pedals, the torque applied to the sun gear by the rider will cause the sun to rotate in a clockwise direction and the second one way clutch to disengage; the first motor/generator being prevented from applying any reactive torque. This will result in turn in an abrupt and substantial reduction in the reactive torque resisting the torque applied by the rider which will be perceived by the rider as an abrupt and substantial reduction in the resistance to his pedaling. The presence of the second one-way clutch will therefore significantly exacerbate the pedal dropping phenomenon referred to above when climbing a hill.

Accordingly, it is the object of the present invention to provide a hub of the type referred to above, particularly for a bicycle, which is small, cheap and light and overcomes some or all of the problems referred to above.

According to the present invention, a hub comprises a substantially cylindrical, hollow hub member, which is mounted to rotate about its axis and accommodated in whose interior is a continuously variable ratio transmission system having an input which is mounted to rotate about the axis and an output connected to rotate with the hub member, the transmission system comprising a single epicyclic gearset including a sun gear in mesh with a plurality of planet gears mounted to rotate about respective planet shafts carried by a common carrier, which is mounted to rotate with the input about the axis, the planet gears being in mesh with an annulus gear, which is connected to rotate with the hub member, the annulus gear and the sun gear being connected to rotate with the rotors of first and second electric motor/generators, respectively, the electrical connections of the stators of the two motor/generators being connected by a controller arranged to control the transmission of power from one motor/generator to the other, the hub further including a one-way clutch, which includes a drive member, which is constituted by the common carrier, and a driven member, which is connected to rotate with the hub member, the one-way clutch being arranged to connect the hub member to rotate with the carrier as soon as the carrier rotates faster than the hub member.

Thus the hub in accordance with the invention includes only a single epicyclic gearset rather than two gearsets as in the prior specification referred to above and this inherently results in the hub being smaller, lighter and cheaper. More importantly, the hub in accordance with the invention also includes a one-way clutch which is arranged to connect the hub member to rotate with the carrier if the carrier rotates faster than the hub member which in practice occurs as soon as any substantial torque is applied to the input. This means that if the hub is fitted to a bicycle, as soon as the rider applies any significant pressure to the pedals, thereby applying a torque to the input of the transmission system, the one-way clutch engages and thus connects the carrier to the hub member. This results in the input immediately being connected to rotate with the hub member and thus in the propulsive force exerted by the cyclist immediately being transmitted to the hub member and thus to the bicycle wheel. The phenomenon of "pedal dropping" is thus completely eliminated. Whilst it is of course conventional for bicycles to include a freewheel mechanism between the rear sprocket wheel connected to the chain driven by the pedals and the hub, the purpose of this freewheel mechanism is to prevent the pedals from being driven in rotation by the driven wheel when the bicycle is freewheeling, e.g. when coasting down a hill. In the absence of such a freewheel mechanism, the pedals would be rotated by the driven wheel when e.g. freewheeling down a hill and this would mean that the cyclist's feet would have to continue to rotate, though without applying any force to the pedals. However, in a hub of the type with which the present invention is concerned including a transmission system including an epicyclic gearset, this phenomenon would not occur and thus a freewheel mechanism is not required for the purpose discussed above.

Thus with a hub of this type, when a bicycle is freewheeling down a hill, the cyclist need merely maintain his feet stationary on the pedals and the pedals are not driven in rotation by the driven wheel. This is the reason why the hub disclosed in the prior specification referred to above does not include a freewheel mechanism. However, the one-way clutch or freewheel mechanism included in accordance with the present invention serves a totally different purpose, namely to ensure that when the cyclist applies a force to the pedals, this force is applied immediately to the driven wheel and no "pedal dropping" occurs. However, when the bicycle is coasting down a hill or if the bicycle is being propelled only by one or both of the electric motor/generators, the one-way clutch will be disengaged, that is to say there will be no direct connection between the input and the hub member.

The one-way clutch may take a variety of different forms but in the preferred embodiment the drive member has a substantially circular outer periphery in which a plurality of recesses is formed, the driven member being of annular shape whose outer periphery is in mesh with the annulus gear and whose inner periphery surrounds the outer periphery of the drive member and together with it defines a plurality of recesses extending in the peripheral direction, each recess accommodating a jamming ball and a spring urging the ball in one peripheral direction, the dimension of each recess in the radial direction being greater than the diameter of the associated ball at the end opposite to the said peripheral direction and progressively decreasing in the direction towards the other end to a value less than the diameter of the associated ball. In this embodiment, the jamming balls are biased by the springs towards the ends of the recesses whose width in the radial direction is greater than the diameter of the balls and the drive member and driven member can therefore rotate freely with respect to one another. However, if the drive member should be caused to rotate relative to the driven member by the application to it of a torque by the cyclist applying pressure to the pedals, the jamming balls will be constrained to move within the recesses in the direction towards the narrower ends of the recesses and will move in that direction until they reach the regions of the recesses where the width of the recesses is equal to the diameter of the balls. When this position is reached, the balls will become jammed between the drive member and the driven member and the two members are then rotationally locked together. Accordingly, continued rotation of the drive member is then transmitted directly to the driven member and thus also to the hub member. Accordingly, when the cyclist applies force to the pedals, after a very small initial free movement, movement of the pedals is transmitted directly to the hub member and will thus accelerate the hub member. However, as soon as the cyclist ceases to apply a force to the pedals, the force exerted by the springs on the jamming balls will be able to move the balls in the said one peripheral direction and as they move in this direction the rotary jamming connection between the drive member and driven member is broken and the clutch is disengaged.

It is preferred that the two motor/generators are coaxial and that one is accommodated within the other. This permits the two motor/generators to be accommodated in a minimum of space and thus contributes to the small size of the hub in accordance with the invention.

In practice, the hub in accordance with the invention will be used in combination with a rechargeable battery connected to the controller and the controller will be additionally arranged to control the flow of power between the battery and the two motor/generators. Thus when fitted to a power-assisted bicycle, the hub in accordance with the invention will permit the bicycle to be driven solely by one or potentially even both of the motor/generators powered by the electric battery or solely by the cyclist applying a rotary force to the pedals, in which event the one-way clutch will of course be engaged so as to transmit the force exerted by the cyclist directly to the hub member, or a combination of one or both of the motor/generators acting as a motor and the cyclist and in this event the one-way clutch may again be engaged.

The invention also embraces a bicycle with a wheel including a hub of the type referred to above. It is preferred that the bicycle includes pedals and a sprocket wheel which is connected to be rotated by the pedals by a chain and is connected to the input member via a freewheel mechanism. The bicycle thus preferably includes two freewheel or one-way clutch mechanisms, the second being provided on the driven sprocket wheel and operating substantially conventionally, that is to say it will disengage when the bicycle is coasting down a hill and will thus permit the common carrier to rotate faster than the sprocket wheel.

It is preferred that the controller is arranged to control one or both of the motor/generators to operate as a generator and to direct the electrical power produced to the battery to recharge it at those times when the bicycle is travelling faster than desired by the user or at those times when the user decides that the battery should be recharged. This state may be detected in a number of ways but in a simple embodiment this is detected by the application of the brakes by the user, which results in a signal being transmitted to the controller to initiate the so-called regenerative braking.

Further features and details of the invention will be apparent from the following description of one specific embodiment of a hub in accordance with the invention, which is given by way of example only with reference to the accompanying drawings, in which.

Figure 1:
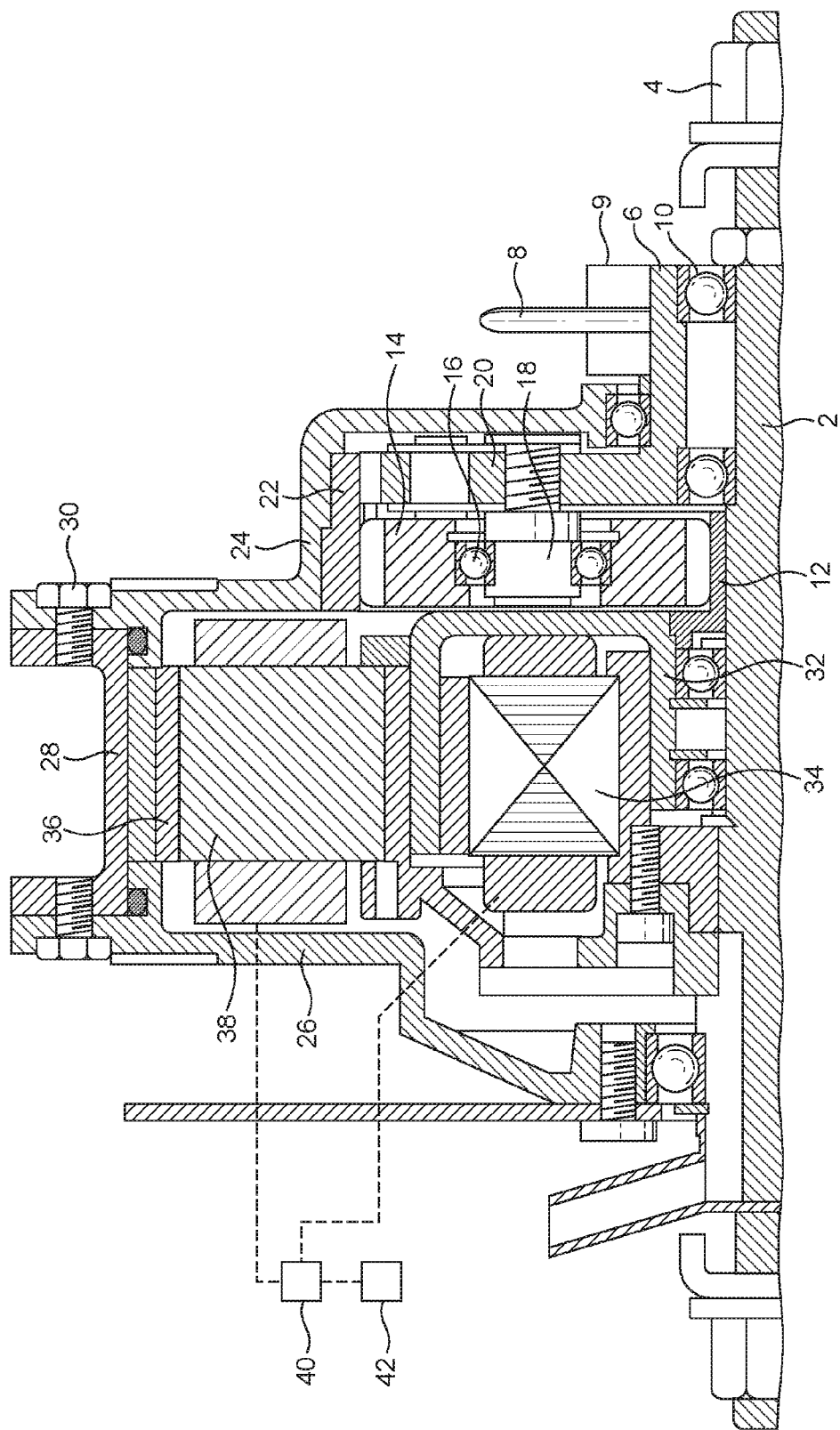
FIG. 1 is an axial sectional view of the upper half of a bicycle hub.

The hub is mounted on a central shaft 2 which, in use, is fixedly secured to a bicycle frame by means of two nuts 4. The hub includes an annular input member 6, which is connected to a conventional bicycle sprocket wheel 8 via a conventional freewheel mechanism 9, which is not shown in detail. The input member 6 is mounted to rotate about the shaft 2 by a number of bearings 10. The input member 6 is also connected to a single three-branch epicyclic gearset, all three branches or shafts of which rotate. The transmission system includes a sun gear 12, which is mounted to rotate about the shaft 2 and carries teeth in mesh with teeth carried by a number, typically 3, of planet gears 14. The planet gears 14 are rotatably carried by way of bearings 16 by respective planet shafts 18, which are connected to a common carrier 20. The teeth on the planet gears 14 are also in mesh with the teeth on an annulus gear 22, which is fixedly connected to the right-hand portion 24 of a hub housing. The right-hand portion 24 of the hub housing is connected to a left-hand portion 26 by means of a central portion 28, which is connected to the right- and left-hand portions 24, 26 by means of bolts 30.

Accommodated within the hub housing are two electric motor/generators, which are arranged coaxially, with one motor/generator situated within the other. The inner motor/generator includes a rotor 32 of generally U-shape, which is connected to rotate with the sun gear 12, and a stator 34. The outer motor/generator includes a rotor 36, which is fixedly connected to the central portion 28 of the hub housing, and a stator 38. The electrical connections of the two stators are connected to a controller 40, which is shown only schematically and is also connected to a rechargeable electric battery 42. The controller 40 is programmed to control the flow of electrical power between the two motor/generators and between the electric battery 42 and each of the two motor/generators in accordance with requirements.

Figure 2:
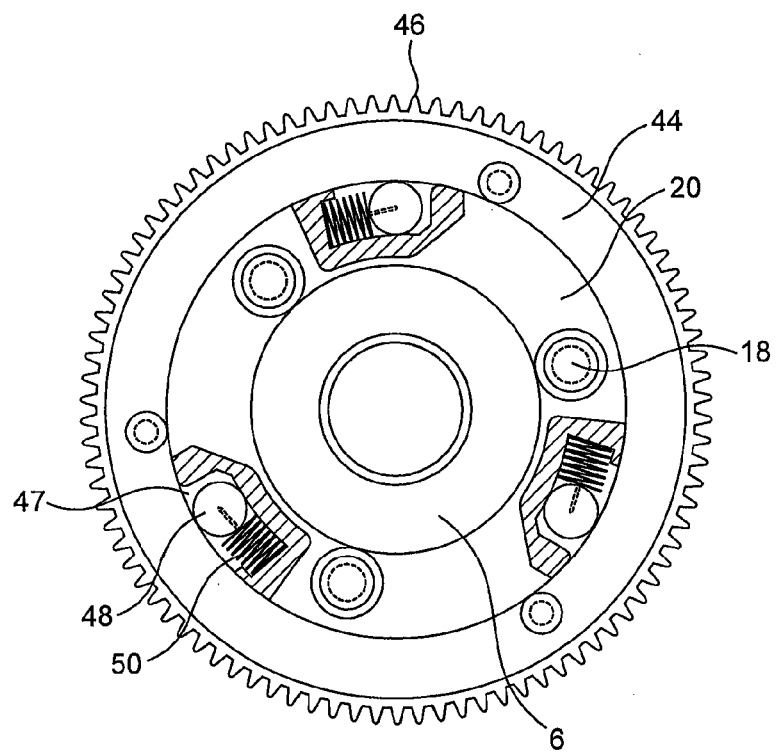
FIG. 2 is a view of the one-way clutch, seen from the right in FIG. 1.
Figure 3:
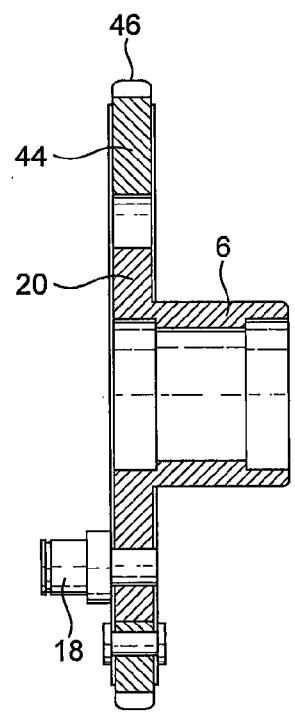
FIG. 3 is an axial sectional view of the one-way clutch.

The common carrier 20 is integral with the input member 6, and constitutes the input member or drive member of a one-way clutch. It has a circular outer periphery, which is closely surrounded by the circular inner periphery of an annular driven member 44 of the one-way clutch, the outer periphery of which bears teeth 46, which are also in mesh with the internal teeth on the annulus gear 22, which is fixedly connected to the hub housing portion 24. Formed in the outer periphery of the inner or drive member 20 of the one-way clutch is a plurality, in this case three, of recesses 47 extending in the peripheral direction. Accommodated in each of these recesses is a jamming ball 48 and a biasing spring 50. The dimension or width of each recess 47 in the radial direction is greatest at the end remote from the spring 50 and at this end it has a value greater than the diameter of the associated jamming ball 48. However, its width decreases in the direction towards the biasing spring 50 to a value less than the diameter of the jamming ball 48. The biasing springs urge the balls 48 to the ends of the recesses 47 remote from the springs 50 at which the width of the recess is greater than the diameter of the balls and when the balls are in this position the drive and driven members 20 and 44 of the one-way clutch are freely rotatable with respect to one another and the clutch is thus disengaged. However, if the inner or drive member of the clutch should move in the clockwise direction as seen in FIG. 2, that is to say if the user of the bicycle should exert a force on the pedals, which is transmitted by the bicycle chain to the sprocket 8 and then to the drive member 20 in the form of a torque tending to rotate the drive member 20, the balls 48 are caused to move in the anticlockwise direction, seen in FIG. 2, and thus towards the region in which the width of the recesses is less than the diameter of the balls. As the balls approach this region, they become jammed between the bases of the recesses 47 and the inner periphery of the outer or driven clutch member 44 and thus act to rotationally connect the two clutch members 20 and 44. Continued rotation of the input member 6 and thus of the clutch member 20 is therefore transmitted directly to the driven clutch member 44 and thus also to the annulus gear 22 and to the hub housing 24, 26, 28, thereby resulting in rotation of the bicycle wheel. If the user should subsequently cease to exert a pressure on the pedals, the force exerted by the biasing springs 50 will be able to return the balls 48 into the regions of the recesses 47 where their width is greater than the diameter of the balls and the rotary connection of the two clutch members is therefore released.

In use, one of the motor/generators generally acts as a generator and transmits electrical power to the other motor/generator, which acts as a motor. The amount of electrical power so transmitted may be selectively varied by means of the controller, thereby altering the transmission ratio of the transmission system. Power is transmitted through the transmission system both mechanically and electrically in proportions which vary with the varying transmission ratio. The output speed of the transmission system and thus the speed of the hub member may thus be varied independently of the input speed, which means that the speed of the wheel connected to the hub member in accordance with the invention may be varied independently of the speed at which the pedals are rotated and/or the speed of that one of the motor/generators which is operating as a motor and is providing a motive torque to propel the bicycle or to assist the user in propelling the bicycle. This means that the transmission may be operated precisely at the speed which is the most appropriate for the driving conditions and matches the wishes of the user, as indicated by one or more user-operable controls.

The electric motor/generators are thus not only the means by which the transmission ratio of the transmission system may be continuously varied but also the means by which electrical power from the battery may be converted into mechanical power and transmitted to the bicycle wheel. The motor/generators preferably also serve a dual function in that if the bicycle is travelling at a speed in excess of that desired by the user, for instance because the bicycle is freewheeling downhill, as indicated e.g. by the user applying the brakes, the controller is programmed to cause one or both motor/generators to operate as a generator and to direct the electrical power produced to the electric battery so as to recharge it.

Whilst one or both of the electric motor/generators may be used in motor mode to drive the bicycle for a major proportion of the time, it is envisaged that the hub in accordance with the invention will be used primarily on a motor-assisted bicycle rather than a motorcycle and thus that the user will contribute to the motive power needed to propel the bicycle for a major proportion of the operating time. As explained above, when the user applies a driving force to the pedals, the one-way clutch will immediately engage and the force applied by the user will then be directed immediately to the driven bicycle wheel with no "pedal dropping".

The invention claimed is:

1. A hub comprising a substantially cylindrical, hollow hub member, which is mounted to rotate about its axis and accommodated in whose interior is a continuously variable ratio transmission system having an input which is mounted to rotate about the axis and an output connected to rotate with the hub member, the transmission system comprising a single epicyclic gearset including a sun gear in mesh with a plurality of planet gears mounted to rotate about respective planet shafts carried by a common carrier, which is mounted to rotate with the input about the axis, the planet gears being in mesh with an annulus gear, which is connected to rotate with the hub member, the annulus gear and the sun gear being connected to rotate with the rotors of first and second electric motor/generators, respectively, the electrical connections of the stators of the two motor/generators being connected by a controller arranged to control the transmission of power from one motor/generator to the other, the hub further including a one-way clutch, which includes a drive member, which is constituted by the common carrier, and a driven member, which is connected to rotate with the hub member, the one-way clutch being arranged to connect the hub member to rotate with the carrier as soon as the carrier rotates faster than the hub member.

2. A hub as claimed in claim 1 in which the drive member has a substantially circular outer periphery in which a plurality of recesses is formed, the driven member being of annular shape whose outer periphery is in mesh with the annulus gear and whose inner periphery surrounds the outer periphery of the drive member and together with it defines a plurality of recesses extending in the peripheral direction, each recess accommodating a jamming ball and a spring urging the ball in one peripheral direction, the dimension of each recess in the radial direction being greater than the diameter of the associated ball at the end opposite to the said peripheral direction and progressively decreasing in the direction towards the other end to a value less than the diameter of the associated ball.

3. A hub as claimed in claim 1 in which the two motor/generators are coaxial and one is accommodated within the other.

4. A hub as claimed in claim 1 in combination with a rechargeable battery connected to the controller which is additionally arranged to control the flow of power between the battery and the two motor/generators.

5. A bicycle with a wheel including a hub as claimed in claim 1.

6. A bicycle as claimed in claim 5 including pedals and a sprocket wheel which is connected to be rotated by the pedals by a chain and is connected to the input member via a freewheel mechanism.

7. A bicycle as claimed in claim 5 further comprising a rechargeable battery connected to the controller which is additionally arranged to control the flow of power between the battery and the two motor/generators.

8. A bicycle as claimed in claim 7 in which the controller is arranged to control one or both of the motor/generators to operate as a generator and to direct the electrical power produced to the battery to recharge it at those times when the bicycle is travelling faster than desired by the user.

9. A bicycle as claimed in claim 5 in which the drive member has a substantially circular outer periphery in which a plurality of recesses is formed, the driven member being of annular shape whose outer periphery is in mesh with the annulus gear and whose inner periphery surrounds the outer periphery of the drive member and together with it defines a plurality of recesses extending in the peripheral direction, each recess accommodating a jamming ball and a spring urging the ball in one peripheral direction, the dimension of each recess in the radial direction being greater than the diameter of the associated ball at the end opposite to the said peripheral direction and progressively decreasing in the direction towards the other end to a value less than the diameter of the associated ball.

10. A bicycle as claimed in claim 5 in which the two motor/generators are coaxial and one is accommodated within the other.

11. A bicycle comprising a wheel including a hub, the hub further comprising a substantially cylindrical, hollow hub member, which is mounted to rotate about its axis and accommodated in whose interior is a continuously variable ratio transmission system having an input which is mounted to rotate about the axis and an output connected to rotate with the hub member, the transmission system comprising a single epicyclic gearset including a sun gear in mesh with a plurality of planet gears mounted to rotate about respective planet shafts carried by a common carrier, which is mounted to rotate with the input about the axis, the planet gears being in mesh with an annulus gear, which is connected to rotate with the hub member, the annulus gear and the sun gear being connected to rotate with the rotors of first and second electric motor/generators, respectively, the electrical connections of the stators of the two motor/generators being connected by a controller arranged to control the transmission of power from one motor/generator to the other, the hub further including a one-way clutch, which includes a drive member, which is constituted by the common carrier, and a driven member, which is connected to rotate with the hub member, the one-way clutch being arranged to connect the hub member to rotate with the carrier as soon as the carrier rotates faster than the hub member.

12. A bicycle as claimed in claim 11 including pedals and a sprocket wheel which is connected to be rotated by the pedals by a chain and is connected to the input member via a freewheel mechanism.

13. A bicycle as claimed in claim 11 further comprising a rechargeable battery connected to the controller which is additionally arranged to control the flow of power between the battery and the two motor/generators.

14. A bicycle as claimed in claim 13 in which the controller is arranged to control one or both of the motor/generators to operate as a generator and to direct the electrical power produced to the battery to recharge it at those times when the bicycle is travelling faster than desired by the user.

* * * * *